April 24, 1962     J. D. HAYES     3,030,860

PROJECTION OPTICAL SYSTEM

Filed March 28, 1960

FIG. 1

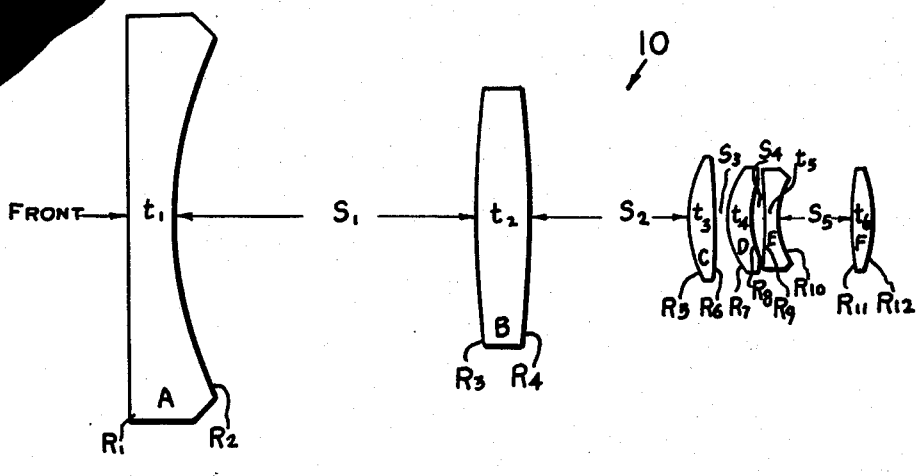

FIG. 2

| \multicolumn{6}{c}{E.F. = 10.02 mm.   B.F. = 8.87 mm.   REL. APERT. = f/2.5   F.A. = 50°} |
| LENS | CURVATURES | THICKNESSES | SPACINGS | $n_D$ | V |
|---|---|---|---|---|---|
| A | $R_1 = \infty$ | $t_1 = 2.205$ | $S_1 = 14.928$ | 1.517 | 64.5 |
|   | $R_2 = 20.35$ |   |   |   |   |
| B | $R_3 = 67.25$ | $t_2 = 2.756$ | $S_2 = 7.717$ | 1.617 | 36.6 |
|   | $R_4 = -67.25$ |   |   |   |   |
| C | $R_5 = 6.39$ | $t_3 = 1.157$ | $S_3 = 0.066$ | 1.517 | 64.5 |
|   | $R_6 = -38.14$ |   |   |   |   |
| D | $R_7 = 4.18$ | $t_4 = 1.025$ | $S_4 = 0.766$ | 1.541 | 59.9 |
|   | $R_8 = 5.31$ |   |   |   |   |
| E | $R_9 = -33.52$ | $t_5 = 0.259$ | $S_5 = 3.776$ | 1.649 | 33.8 |
|   | $R_{10} = 3.74$ |   |   |   |   |
| F | $R_{11} = 13.59$ | $t_6 = 0.937$ |   | 1.517 | 64.5 |
|   | $R_{12} = -7.82$ |   |   |   |   |

ALL LENSES FORMED FROM GAMMA RADIATION RESISTANT GLASS

*INVENTOR.*
JOHN D. HAYES
BY Frank C. Parker
*ATTORNEY*

United States Patent Office 3,030,860
Patented Apr. 24, 1962

3,030,860
PROJECTION OPTICAL SYSTEM
John D. Hayes, Rochester, N.Y., assignor to Bausch & Lomb Incorporated, a corporation of New York
Filed Mar. 28, 1960, Ser. No. 17,943
2 Claims. (Cl. 88—57)

This invention relates to optical systems and more particularly relates to projection objectives of relatively short focal length which are used in television cameras and kindred optical devices and are operated in areas of intense gamma radiation.

Optical systems of the kind mentioned above are peculiarly useful in nuclear development programs as an essential component of remotely operated television cameras which are located in areas of intense gamma radiation to observe or record the activity of physical objects of particles in said areas.

In situations where the gamma radiation field reaches the order of about $10^5$ roentgens, the lens members of said optical systems when made of the usual optical glasses become discolored to such an extent that these members become virtually useless as either lenses or windows. All types of ordinary optical glass exhibit discoloration in various shades of brown so that special cerium bearing glasses have recently been made available to overcome this problem.

Extensive calculation and development has been done in the present invention for the purpose of utilizing "non-browning" cerium bearing glasses in a projection objective having enduring good light transmitting qualities and high grade imaging properties.

It is an object of this invention to provide a novel projection objective or the like which withstands intense gamma radiation without resulting in discoloration of the optical materials contained therein, said objective being of relatively short focus and being well corrected for producing an image of superior quality.

Further objects and advantages reside in the details of construction described in the specification herebelow which will be best understood by reference to the accompanying drawing, wherein:

FIG. 1 is an optical diagram of an optical system embodying my invention, and

FIG. 2 is a table of constructional data related to one successful form of a projection objective according to my invention.

Such a projection objective of preferred form is shown generally by the numeral 10 in FIG. 1 of the drawing comprising a plano-concave negative lens A having its plano side facing the front of the objective, a biconvex positive lens B spaced rearwardly therefrom, a second biconvex single lens C having positive power and having its refractive surface of strongest curvature facing the front or object side of the objective. Located closely to the rear side of lens C is a single meniscus lens D having positive power and having its convex side facing toward the front. Immediately rearwardly of lens D is located a biconcave single lens E of negative power having its surface of strongest curvature facing rearwardly adjacent to a wide diaphragm space. Situated rearmost is a biconvex single lens F of positive power, lens F being optically aligned on a common axis with all of the other lenses and having its surface of strongest curvature facing rearwardly.

The projection objective 10 so constituted works at finite conjugates to project a well-corrected image of an object at an image plane, not shown. A distinctive feature of the present objective is the relatively short equivalent focal length (E.F.L.) which is numerically approximately 28% of the overall length of said optical system.

According to this invention, careful computation and experimentation of lens elements using the limited variety of cerium bearing non-browning optical glasses now available have disclosed that an objective of high grade performance may be produced by choosing glass having the same refractive index ($n_D$) and Abbe number ($v$) for lenses A, C and F. Furthermore, the refractive index of the glass in lens E should exceed the refractive index of the lens A by substantially .132. Furthermore, it has been determined that the values of radii of curvature $R_1$ to $R_{12}$ of the refractive surfaces of the respective lens members, the axial thicknesses $t_1$ to $t_6$ of the respective lens members A to F and the lengths of the air spaces $S_1$ to $S_5$ should be according to the statement of inequalities given herebelow:

$$R_1 = \infty$$
$$1.8F < R_2 < 2.2F$$
$$6.1F < R_3 < 7.3F$$
$$6.1F < -R_4 < 7.3F$$
$$.57F < R_5 < .70F$$
$$3.43F < -R_6 < 5.0F$$
$$.37F < R_7 < .45F$$
$$.48F < R_8 < .58F$$
$$2.92F < -R_9 < 3.68F$$
$$.35F < R_{10} < .40F$$
$$1.20F < R_{11} < 1.50F$$
$$.7F < -R_{12} < .85F$$
$$.2F < t_1 < .25F$$
$$.25F < t_2 < .30F$$
$$.10F < t_3 < .13F$$
$$.9F < t_4 < 1.1F$$
$$.02F < t_5 < .03F$$
$$.08F < t_6 < .10F$$
$$1.34F < S_1 < 1.64F$$
$$.70F < S_2 < .85F$$
$$.005F < S_3 < .007F$$
$$.07F < S_4 < .08F$$
$$.35F < S_5 < .40F$$

the values for the refractive index and Abbe number related to the cerium bearing glass in the first, third and rearmost lens being the same and the refractive index of said negative lens exceeding the refractive index of the first lens in value by substantially .132, and wherein F represents the equivalent focus of said objective.

A typical successful example of a projection objective of 10.0 mm. focal length constructed with special cerium bearing optical glasses according to this invention is given in the following table of constructional data, the field coverage being substantially 50°.

[E.F.L. = 10 mm.  B.F. = 8.87.  Rel. Apert. = f/2.5.  F.A. = 50°]

| Lens | Curvatures | Thicknesses | Spacing | $n_D$ | $v$ |
|---|---|---|---|---|---|
| A | $R_1 = \infty$ | $t_1 = 2.205$ | | 1.517 | 64.5 |
|   | $R_2 = 20.35$ | | $S_1 = 14.928$ | | |
| B | $R_3 = 67.25$ | $t_2 = 2.756$ | | 1.617 | 36.6 |
|   | $R_4 = -67.25$ | | $S_2 = 7.717$ | | |
| C | $R_5 = 6.39$ | $t_3 = 1.157$ | | 1.517 | 64.5 |
|   | $R_6 = -38.14$ | | $S_3 = 0.066$ | | |
| D | $R_7 = 4.18$ | $t_4 = 1.025$ | | 1.541 | 59.9 |
|   | $R_8 = 5.31$ | | $S_4 = 0.766$ | | |
| E | $R_9 = -33.52$ | $t_5 = 0.259$ | | 1.649 | 33.8 |
|   | $R_{10} = 3.74$ | | $S_5 = 3.776$ | | |
| F | $R_{11} = 13.59$ | $t_6 = 0.937$ | | 1.517 | 64.5 |
|   | $R_{12} = -7.82$ | | | | |

It is submitted that there is here provided a novel short focal projection objective which is conceived and constructed for the specific purpose of utilizing the non-browning properties in cerium bearing glasses in such objectives which are used in regions of intense gamma radiation, all of which is in accord with the stated objects of this invention.

Although only a single form of my invention has been shown and described in detail, other forms are possible and changes may be made in the specific constructional data therein without departing from the spirit of this invention as described in the claims here appended.

I claim:

1. A short focus projection objective and the like having a relative aperture as great as $f/2.5$ and an overall length approximately equal to 3.5 times the equivalent focal length, said objective working at finite conjugates and forming an image of an object upon a suitable receptive device, said objective comprising a sequence of six optically aligned air spaced single lenses formed from cerium bearing glasses which are highly resistant to coloration effects when exposed to gamma radiation, said lenses named in order from the front of the objective being a plano-concave negative lens having the plano side facing toward said object, a double convex positive lens, a second double convex positive lens, a positive meniscus lens having its concave side facing rearwardly, a negative double concave lens and a rearmost double convex lens, the radius of curvature of the refractive surfaces of said lenses $R_1$ to $R_{12}$, the axial thicknesses $t_1$ to $t_6$ of the respective lenses, and the spacings $S_1$ to $S_5$ of said lenses being as given in the statements of inequalities herebelow:

$$R_1 = \infty$$
$$1.8F < R_2 < 2.2F$$
$$6.1F < R_3 < 7.3F$$
$$6.1F < -R_4 < 7.3F$$
$$.57F < R_5 < .70F$$
$$3.43F < -R_6 < 5.0F$$
$$.37F < R_7 < .45F$$
$$.48F < R_8 < .58F$$
$$2.92F < -R_9 < 3.68F$$
$$.35F < R_{10} < .40F$$
$$1.20F < R_{11} < 1.50F$$
$$.7F < -R_{12} < .85F$$
$$.2F < t_1 < .25F$$
$$.25F < t_2 < .30F$$
$$.10F < t_3 < .13F$$
$$.9F < t_4 < 1.1F$$
$$.02F < t_5 < .03F$$
$$.08F < t_6 < .10F$$
$$1.34F < S_1 < 1.64F$$
$$.70F < S_2 < .85F$$
$$.005F < S_3 < .007F$$
$$.07F < S_4 < .08F$$
$$.35F < S_5 < .40F$$

the values for the refractive index and Abbe number related to the cerium bearing glass in the first, third and rearmost lenses being the same and the refractive index of said negative lens exceeding the refractive index of the first lens in value by substantially .132, and wherein F represents the equivalent focus of said objective.

2. A short focus projection objective and the like having a relative aperture as great as $f/2.5$ and working at finite conjugates, said objective forming an image of an object upon a suitable receptive device, said objective being composed of six optically aligned single lens members formed from cerium bearing glasses which are highly resistant to coloration effects when exposed to gamma radiation, said lenses named in order from the front or entrant side of said objective being a plano-concave negative lens having a plano side facing toward said object, a double convex positive lens, a second positive double convex lens, a positive meniscus lens which is convex toward the front, a double concave negative lens, and a double convex positive lens, said objective being constructed according to the constructional data given in the table herebelow:

[E.F.L.=10 mm. B.F.=8.87. Rel. Apert.=$f/2.5$. F.A.=50°]

| Lens | Curvatures | Thicknesses | Spacing | $n_D$ | $\nu$ |
|---|---|---|---|---|---|
| A | $R_1=\infty$<br>$R_2=20.35$ | $t_1=2.205$ |  | 1.517 | 64.5 |
|  |  |  | $S_1=14.928$ |  |  |
| B | $R_3=67.25$<br>$R_4=-67.25$ | $t_2=2.756$ |  | 1.617 | 36.6 |
|  |  |  | $S_2=7.717$ |  |  |
| C | $R_5=6.39$<br>$R_6=-38.14$ | $t_3=1.157$ |  | 1.517 | 64.5 |
|  |  |  | $S_3=0.066$ |  |  |
| D | $R_7=4.18$<br>$R_8=5.31$ | $t_4=1.025$ |  | 1.541 | 59.9 |
|  |  |  | $S_4=0.766$ |  |  |
| E | $R_9=-33.52$<br>$R_{10}=3.74$ | $t_5=0.259$ |  | 1.649 | 33.8 |
|  |  |  | $S_5=3.776$ |  |  |
| F | $R_{11}=13.59$<br>$R_{12}=-7.82$ | $t_6=0.937$ |  | 1.517 | 64.5 | wherein $R_1$ to $R_{12}$ designate the radius of curvature of the lens surfaces, named in order from the front of the objective rearwardly, $t_1$ to $t_6$ designate the axial thicknesses of the lens members A to F, respectively, $S_1$ to $S_5$ designate the air spaces between said respective lens members A to F, E.F.L represents the equivalent focal length of said objective, $n_D$ designates the refractive index and $\nu$ designates the Abbe number of the optical materials used in said lenses.

No references cited.